United States Patent
Hayashi

(10) Patent No.: US 7,254,770 B2
(45) Date of Patent: Aug. 7, 2007

(54) SENSOR APPARATUS AND MONITORING METHOD OF CONTROL SYSTEM USING DETECTED DATA FROM SENSOR APPARATUS

(75) Inventor: Yasukazu Hayashi, Niwa-gun (JP)

(73) Assignee: Okuma Corporation, Aichi (JP)

( * ) Notice: Subject to any disclaimer, the term of this patent is extended or adjusted under 35 U.S.C. 154(b) by 461 days.

(21) Appl. No.: 10/442,169

(22) Filed: May 21, 2003

(65) Prior Publication Data

US 2003/0223374 A1    Dec. 4, 2003

(30) Foreign Application Priority Data

May 30, 2002    (JP)    ............... 2002-157025

(51) Int. Cl.
   *H03M 13/00*    (2006.01)
(52) U.S. Cl. ...................... 714/776; 714/758
(58) Field of Classification Search ............... 714/776, 714/758
   See application file for complete search history.

(56) References Cited

U.S. PATENT DOCUMENTS

| | | | | |
|---|---|---|---|---|
| 4,493,021 A | * | 1/1985 | Agrawal et al. | 709/236 |
| 4,665,519 A | * | 5/1987 | Kirchner et al. | 370/349 |
| 4,677,614 A | * | 6/1987 | Circo | 370/222 |
| 4,703,477 A | * | 10/1987 | Adelmann et al. | 370/474 |
| 4,970,714 A | * | 11/1990 | Chen et al. | 370/216 |
| 5,051,998 A | * | 9/1991 | Murai et al. | 714/762 |
| 5,084,877 A | * | 1/1992 | Netravali et al. | 714/748 |
| 5,479,408 A | * | 12/1995 | Will | 370/313 |
| 5,539,914 A | * | 7/1996 | Fry et al. | 710/7 |
| 5,825,508 A | * | 10/1998 | Mukai | 358/412 |
| 7,069,033 B1 | * | 6/2006 | Moon et al. | 455/522 |

FOREIGN PATENT DOCUMENTS

| | | |
|---|---|---|
| DE | 198 09 071 C2 | 9/1999 |
| DE | 101 12 843 A1 | 9/2001 |
| JP | B2-56-035062 | 8/1981 |
| JP | A-03-052400 | 3/1991 |
| JP | B2-05-048013 | 7/1993 |
| JP | A-10-041963 | 2/1998 |

* cited by examiner

*Primary Examiner*—Joseph D. Torres
(74) *Attorney, Agent, or Firm*—Oliff & Berridge, PLC

(57) ABSTRACT

A counter within a rotary encoder outputs 8-bit count data CT for counting up at a period equal to or faster than the transmission period of positional data. When the rotary encoder receives a communication frame for positional data request command STX at a receiving circuit from a servo control apparatus, a sensor control computer feeds a positional detected information including a destination address data DA indicating the servo control apparatus, a source address data SA, 40-bit positional detected data PS, 8-bit status data STS, and count data CT to a transmitting circuit. The transmitting circuit adds a 16-bit cyclic code CRC allowing the detection of an error in the input data to the end of the input positional detected information, converts it to serial data as serial signal SRX, and transmits it to the servo control apparatus.

2 Claims, 4 Drawing Sheets

| SF | DA | CM | CRC | EF |

Fig. 5 PRIOR ART

| SF | DA | SA | PS (40 bit) | STS | CRC | EF |

Fig. 6 PRIOR ART

SENSOR APPARATUS AND MONITORING METHOD OF CONTROL SYSTEM USING DETECTED DATA FROM SENSOR APPARATUS

FIELD OF THE INVENTION

The present invention relates to a sensor apparatus for transmitting a physical quantity, such as position or speed, through a serial communications network, and relates to a monitoring method for a system for controlling a parameter according to detected data from the sensor apparatus through serial communications, and more particularly to improving the reliability of numerically controlled apparatuses, such as for controlling machine tools.

BACKGROUND OF THE INVENTION

In a numerically controlled apparatus, such as for performing motor control of a movable shaft in a machine tool, an absolute rotary encoder is used as a sensor apparatus for movable positional detection of a feed shaft, and for rotor pole positional detection and speed detection of a motor. In recent absolute rotary encoders, serial communications are primarily used as an output method for the detected data to reduce the amount of wiring.

FIG. 4 shows a block diagram of a system including a conventional sensor apparatus and numerically controlled apparatus.

A host monitor apparatus 10 calculates and generates positional command data for a control shaft from an internal host control computer 12. The host control computer 12 feeds the calculated positional command data PO to a transmitting circuit 11 at fixed time intervals. The transmitting circuit 11 converts the positional command data PO into a serial signal HTX and transmits it to a servo control apparatus 3. The servo control apparatus 3 controls a motor current UVW so that the rotary shaft of a motor 2 is rotated according to the positional command data PO.

The servo control apparatus 3 transmits to an absolute rotary encoder 1, which is a sensor for detecting the position of the rotary shaft of the motor 2, a positional data request command as a serial signal STX at an interval shorter than the transmission cycle of the positional command data. FIG. 5 shows the structure of the transmission frame for the positional data request command. In the figure, SF is a communication control code indicating the start of the communication frame, DA is data indicating the communication address of the other party, or the rotary encoder 1, CM is a command code indicating the frame is a positional data request command, CRC is an error check code from data DA to CM and is data for detecting errors in the transmit data, and EF is a communication control code indicating the end of the communication frame.

The rotary encoder 1 includes a high precision sensor 4 for detecting the rotational position of the motor 2 at a high precision and high resolution, a single rotation sensor 5 for detecting the absolute position within one rotation, and a multiple rotation sensor 6 for detecting multiple rotations. Using a sensor control computer 7, the rotary encoder 1 combines and converts the positional information from the three sensors into a 40-bit positional detected data PS representing single rotation information in 24 bits and multiple rotation information in 16 bits. Furthermore, the sensor control computer 7 checks that there is no conflict in the positional information from the three sensors, and converts the result into an 8-bit status data STS. When the rotary encoder 1 receives the communication frame for the positional data request command at a receiving circuit 8 from the servo control apparatus 3, the sensor control computer 7 combines the 40-bit positional data and the 8-bit status data and further the destination address data DA indicating the servo control apparatus 3 and the address data SA indicating the source, and then feeds these data as the positional detected information to a transmitting circuit 9. The transmitting circuit 9 transmits the input positional detected information as a serial signal SRX to the servo control apparatus 3. FIG. 6 shows the transmission frame structure for the positional detected information.

When the servo control apparatus 3 receives the frame for the positional detected information from the rotary encoder 1, the data is converted to rotor pole positional data and speed data of the motor 2, and the control of the motor current UVW, the speed control, and the positional control are performed. Furthermore, the servo control apparatus 3 converts the positional detected data PS from the rotary encoder 1 into a serial signal HRX and transmits it to a host monitor apparatus 10. A host control computer 12 monitors for system errors by comparing the positional command data PO and the positional detected data PS that is received from a receiving circuit 15.

Numerically controlled apparatuses, such as the one shown in FIG. 4, uses a sensor apparatus having high reliability by including a plurality of sensors as in the absolute rotary encoder 1 and mutually checking the individual sensor information. Furthermore, by adding an error checking code to the transmit data in the serial communications, a communication quality having high reliability is maintained to ensure sufficient reliability during actual operation. However, in the event an error occurs in a component part of the servo control apparatus 3, a difference may exist between the positional data transmitted by the rotary encoder 1 and the positional detected data transmitted by the servo control apparatus 3 to the host monitor apparatus 10. At this time, the servo control apparatus 3 cannot detect the error, and further it is also possible the system error cannot be detected at the host monitor apparatus 10 by comparing the positional data and the positional command data. Generally, if the erroneous but updated sensor data is output to the host monitor apparatus due to a malfunction of the servo control apparatus, the difference between the sensor data and the command data often makes it possible to detect errors at the host monitor apparatus. However, if the erroneous but non-updated data is output to the host monitor apparatus due to a malfunction of the servo control apparatus, the error is not detected. For example, in case of that the motor is rotating but the sensor information is not updated with that state, if the host monitor apparatus is outputting the stop command, the host monitor apparatus determines as normal state because the motor seems as stopped. Thus, if further reliability of the system is desirable, a receiving circuit 14 capable of receiving positional detected data from the rotary encoder 1 in a path different from the servo control apparatus 3 is added to the host monitor apparatus 10 as shown in FIG. 4. The host monitor apparatus 10 compares the positional detected data that is received by the receiving circuit 14 and the positional command data or the current positional data from the servo control apparatus 3 to make it possible to more reliably detect an error in the positional detected data.

To further improve the reliability in numerically controlled apparatuses using a conventional sensor apparatus, it is necessary to receive the transmit data from the sensor apparatus along a communication path different from the servo control apparatus. Thus, the amount of wiring increases and an additional receiving circuit becomes necessary. This therefore results in problems where the overall cost of the system increases and the failure rate of the system increases by the increased amount of the hardware components, such as the receiving circuit and wiring.

The present invention solves the aforementioned problems and is intended to reduce the cost and provide a sensor apparatus and a system monitoring method for configuring a system of high reliability.

SUMMARY OF THE INVENTION

A sensor apparatus relating to the present invention for transmitting detected data to an external through serial communications, comprises an update check data output device for outputting a value differing from a previous value at each transmission, an error check data calculator for calculating a value that allows to detect errors of the detected data and the update check data, and a transmitter for transmitting the detected data, the update check data, and the error check data in a single transmission frame.

A monitoring method relating to the present invention is the monitoring method of a control system in accordance with detected data from a sensor apparatus, comprises a data transmitting step that the sensor apparatus transmits the detected data, an update check data of a value differing from a previous value at each transmission, and an error check data for allowing detection of errors of the detected data and the update check data, through serial communications to a control apparatus in a single transmission frame, and a system monitoring step that is performed on the basis of an error of the update check data and an error of the error check data using the update check data and the error check data.

According to the sensor apparatus and the monitoring method relating to the present invention, even if a controller or the like is disposed and the detected data is relayed between the sensor apparatus and the monitoring apparatus, the monitoring apparatus performs error monitoring of the update check data and monitoring of the error check data so that an error can be detected by monitoring that the update check data has not changed even in the case where detected data is not updated due to a malfunction of the control apparatus. Furthermore, in the case where an error exists in the detected data or changed data due to a malfunction of the control apparatus, the error can be detected from the error check data.

BRIEF DESCRIPTION OF THE DRAWINGS

FIG. 5 shows a communication frame for the detected data transfer request command of FIG. 4.

FIG. 6 shows a communication frame for the positional detected information of FIG. 4.

DETAILED DESCRIPTION OF THE INVENTION

An embodiment of the present invention will be described with reference to the attached drawings.

Figure 1:
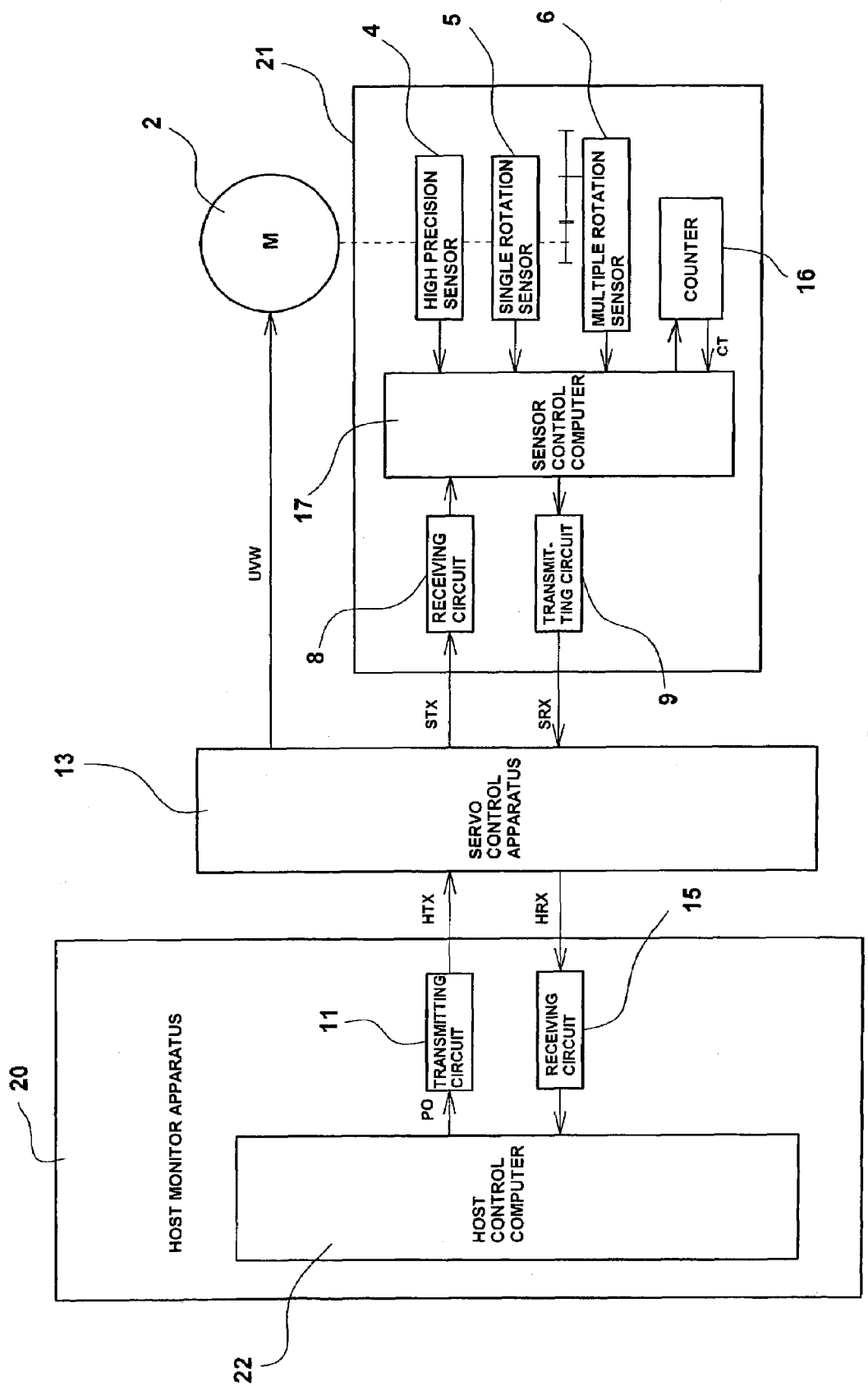
FIG. 1 is a block diagram showing an embodiment of a sensor apparatus and numerically controlled apparatus of the present invention.
Figure 2:
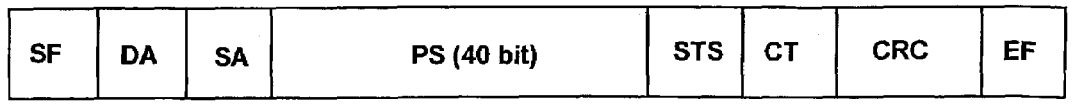
FIG. 2 shows a communication frame for the positional detected information of FIG. 1.
Figure 4:
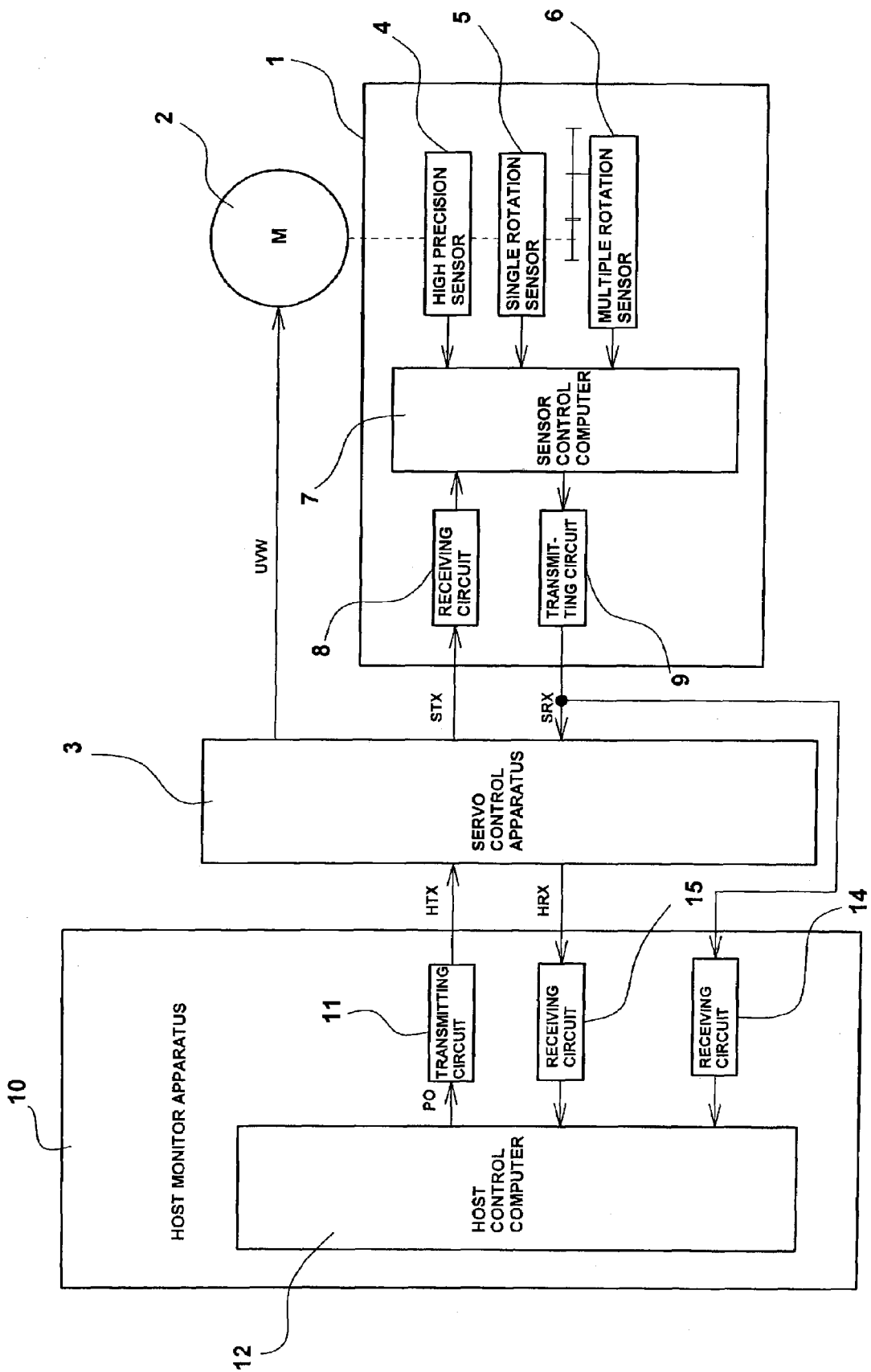
FIG. 4 is a block diagram of a conventional sensor apparatus and numerically controlled apparatus.

FIG. 1 is a block diagram showing an embodiment of the sensor apparatus and numerically controlled apparatus of the present invention. The components that are identical to those in FIG. 4 are given the same reference numerals and their detailed descriptions are omitted. A counter 16 within a rotary encoder 21 outputs an 8-bit count data CT as update check data at a period equal to or faster than the transmission period of the positional data. When the rotary encoder 21 receives at the receiving circuit 8 a communication frame for the positional data request command STX from a servo control apparatus 13, a sensor control computer 17 transmits, to a transmitting circuit 9, a positional detected information including a destination address data DA indicating the servo control apparatus 13, an address data SA indicating the source, 40-bit positional detected data PS, 8-bit status data STS, and count data CT. At the transmitting circuit 9, a 16-bit cyclic code CRC that allows an error in the input data to be detected is added to the end of the input positional detected information, converted to serial data as a serial signal SRX, and transmitted to the servo control apparatus 13. FIG. 2 shows the transmission frame structure at this time.

Figure 3:
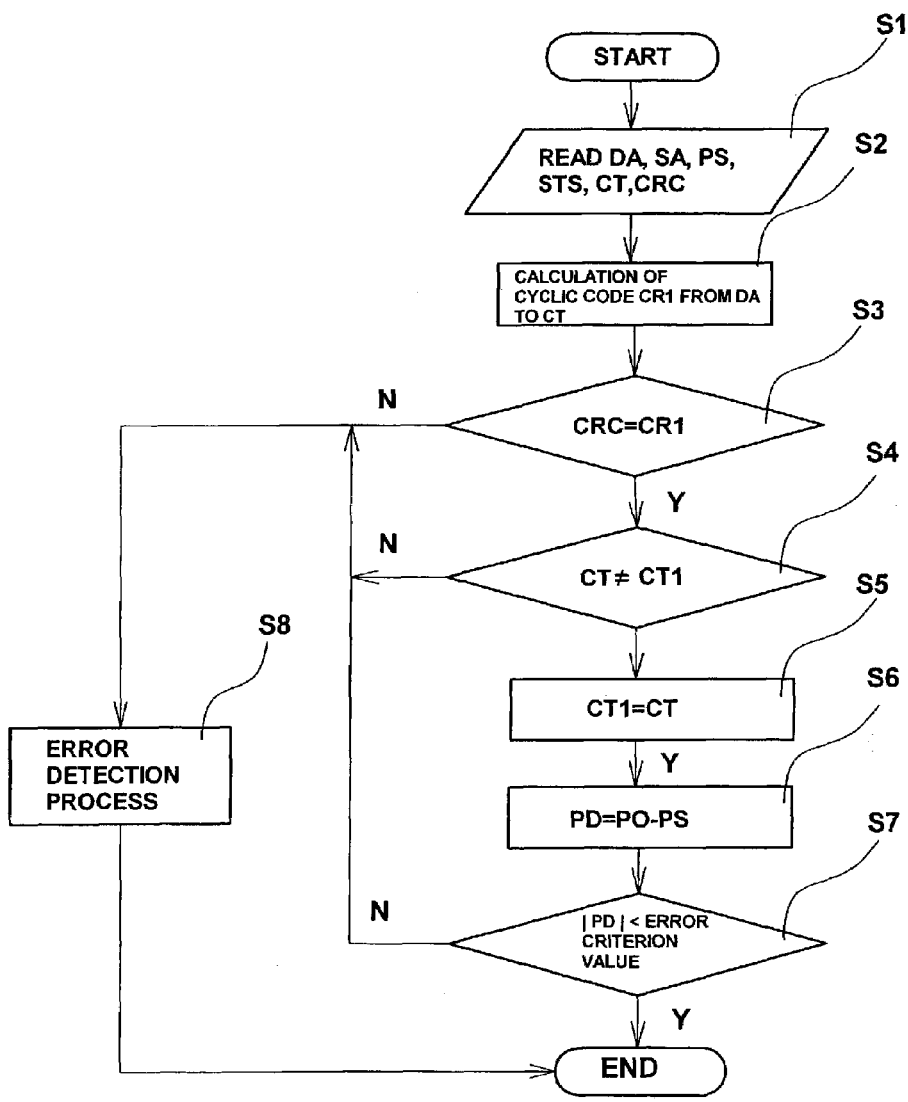
FIG. 3 is a flowchart showing a process of the host control computer 22 of FIG. 1.

When the servo control apparatus 13 receives the transmission frame from the rotary encoder 21, the control of the motor current UVW, the speed control, and the positional control are performed according to the positional detected data PS in the frame. Furthermore, at the servo control apparatus 13, the 40-bit positional data from the rotary encoder 21, the 8-bit status data STS, the 8-bit counter data CT, and the 16-bit cyclic code data CRC are added to other control information, then converted to a serial signal HRX and transmitted to a host monitor apparatus 20. At the host monitor apparatus 20, the process shown in the flowchart of FIG. 3 is performed by the host control computer 22. In step S1, the fixed data of the destination address data DA and the source address data SA are read from a preset memory area. Furthermore, the positional detected data PS, the status data STS, the count data CT, and the cyclic code data CRC are read from the receiving circuit 15. In step S2, a calculation is performed to obtain a 16-bit cyclic code CR1 from the destination address data DA to the count data CT. In step S3, the cyclic code data CRC, or the error check data, and CR1 are compared. If they are identical, it is determined there is no error and the process of S4 is performed. If they differ, it is determined there is an error and the process of S8 is performed. In step S4, the received count data CT and the previous count data CT1 are compared. If they are different, it is determined there is no error and the process of S5 is performed. If they are identical, it is determined there is an update error and the process of S8 is performed. In step S5, the count data CT is substituted into CT1 for the next transmission process. In step S6, a difference data PD of the positional command data PO and the positional detected data PS is obtained. In step S7, the absolute value of the difference data PD and an error criterion value are compared. If the difference data PD is less than the error criterion value, it is determined there is no error and the processing terminates. If not, it is determined there is an error and the process of S8 is performed. An error detection process, such as emergency stop, is performed in step S8.

As described above, in the case an error occurs in a component part of the servo control apparatus and the servo control apparatus relays erroneous positional detected information to the host monitor apparatus, the cyclic code CRC, or error check data, is monitored as shown in the process of step S3 to allow an error, such as in the positional detected information, to be detected. Furthermore, in the case the servo control apparatus 13 malfunctions and the same prior positional detected information, which does not result in an error in the cyclic code CRC, is always output to the host monitor apparatus, the count data CT, or update check data, which is a value that differs from the previous value, is monitored as shown in the process of step S4 to allow an error in the positional detected information to be detected.

Furthermore, even in the case the rotary encoder 21 fails and the same prior positional detected information is always transmitted to the servo control apparatus, it is possible to detect the error.

Although the host monitor apparatus was given as an example for the monitoring means in the embodiment, errors can be monitored so that the motor does not exceed a hazardous rotational position or rotational speed by including a monitoring computer within the servo control apparatus. Furthermore, although an incremental counter was given as an example as an update check data outputting means for outputting a value differing from the previous value at each transmission in the embodiment, a function computing unit may also be used for outputting different data at each calculation. Moreover, the present invention does not limit the sensor apparatus to a rotary encoder, and a sensor apparatus using a sensor capable of detecting any physical quantity, such as speed or temperature, may be used.

According to the present invention as described above, a highly reliable and low cost numerically controlled apparatus capable of controlling a parameter using a sensor apparatus and detected data from the sensor apparatus can be realized without additional hardware as in the prior art. Furthermore, it is possible to detect an error in the sensor apparatus.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A monitoring system including a sensor apparatus, a control apparatus, and a monitor apparatus, wherein the sensor apparatus transmits, in a single transmission frame, detected data, update check data including a value that differs from a previous value at each transmission, and error check data that allow detection of errors in the detected data and the update check data, via a serial signal to the control apparatus;

the control apparatus controls an object to be controlled in accordance with the transmitted detected data, and transmits the detected data, the update check data, and the error check data via a serial signal to the monitor apparatus;

the monitor apparatus determines presence or absence of an error in the currently-received update check data based on the currently-received update check data and previously-received update check data;

the monitor apparatus monitors the system based on the presence or absence of error in the error check data and the presence or absence of the error in the update check data; and the sensor apparatus does not transmit the transmission frame to the monitor apparatus.

2. A method for monitoring a system including a sensor apparatus, a control apparatus, and a monitor apparatus, wherein the sensor apparatus transmits, in a single transmission frame, detected data, update check data including a value that differs from a previous value at each transmission, and error check data that allow detection of errors in the detected data and the update check data, via a serial signal to the control apparatus;

the control apparatus controls an object to be controlled in accordance with the transmitted detected data, and transmits the detected data, the update check data, and the error check data via a serial signal to the monitor apparatus;

the monitor apparatus determines presence or absence of an error in the currently-received update check data based on the currently-received update check data and previously-received update check data;

the monitor apparatus monitors the system based on the presence or absence of error in the error check data and the presence or absence of the error in the update check data; and the sensor apparatus does not transmit the transmission frame to the monitor apparatus.

* * * * *